(12) United States Patent
Onoue et al.

(10) Patent No.: US 7,683,123 B2
(45) Date of Patent: Mar. 23, 2010

(54) AQUEOUS COATING COMPOSITION

(75) Inventors: Sei-ichi Onoue, Ibaraki (JP); Shigeto Kamimura, Ibaraki (JP)

(73) Assignee: SK Kaken Co., Ltd., Osaka (JP)

( * ) Notice: Subject to any disclaimer, the term of this patent is extended or adjusted under 35 U.S.C. 154(b) by 0 days.

(21) Appl. No.: 10/596,590

(22) PCT Filed: Dec. 24, 2004

(86) PCT No.: PCT/JP2004/019361

§ 371 (c)(1),
(2), (4) Date: Jun. 16, 2006

(87) PCT Pub. No.: WO2005/063899

PCT Pub. Date: Jul. 14, 2005

(65) Prior Publication Data

US 2007/0106008 A1 May 10, 2007

(30) Foreign Application Priority Data

Dec. 25, 2003 (JP) ............... 2003-430064
Jul. 6, 2004 (JP) ............... 2004-199898
Jul. 6, 2004 (JP) ............... 2004-199899
Jul. 6, 2004 (JP) ............... 2004-199900

(51) Int. Cl.
C08F 2/16 (2006.01)
C08K 3/34 (2006.01)
C08K 3/00 (2006.01)

(52) U.S. Cl. ............... 524/800; 524/492; 524/847
(58) Field of Classification Search ............ 524/800, 524/492, 847
See application file for complete search history.

(56) References Cited

U.S. PATENT DOCUMENTS

| | | | | |
|---|---|---|---|---|
| 3,069,375 A | * | 12/1962 | Storrow et al. | ............. 524/510 |
| 4,427,823 A | * | 1/1984 | Inagaki et al. | ................ 522/83 |
| 5,204,387 A | | 4/1993 | Matsuzaki et al. | |
| 5,506,325 A | * | 4/1996 | Swarup et al. | ........ 526/318.41 |
| 5,891,948 A | * | 4/1999 | Kano | .......... 524/492 |
| 5,961,674 A | * | 10/1999 | Gagliardi et al. | ............. 51/295 |
| 6,008,291 A | * | 12/1999 | Weinberger et al. | ......... 524/802 |
| 6,271,293 B1 | | 8/2001 | Karuga et al. | |
| 6,433,076 B1 | | 8/2002 | Kamimura et al. | |

FOREIGN PATENT DOCUMENTS

| | | |
|---|---|---|
| CN | 1248279 A | 3/2000 |
| EP | 0 493 076 A1 | 7/1992 |
| JP | 02275712 A * | 11/1990 |
| JP | 4-304273 | 10/1992 |
| JP | 10-168382 | 6/1998 |
| JP | 11-181339 | 7/1999 |
| JP | 11-217480 | 8/1999 |
| JP | 11-236518 | 8/1999 |
| JP | 11246826 A * | 9/1999 |
| JP | 2001-262070 A | 9/2001 |
| JP | 2002-12828 A | 1/2002 |
| JP | 2002-53814 A | 2/2002 |
| JP | 2003-128998 A | 5/2003 |
| JP | 2004-51879 A | 2/2004 |
| JP | 2004-75757 A | 3/2004 |
| JP | 2004-359834 A | 12/2004 |
| WO | WO 94/06870 | 3/1994 |
| WO | WO98/22547 | 5/1998 |
| WO | WO99/05228 | 4/1999 |
| WO | WO 01/62864 A1 | 8/2001 |

* cited by examiner

*Primary Examiner*—Vasu Jagannathan
*Assistant Examiner*—Karuna P Reddy
(74) *Attorney, Agent, or Firm*—Knobbe Martens Olson & Bear, LLP

(57) ABSTRACT

The invention provides an aqueous coating composition, which can simplify storage of an anti-staining agent and is excellent not only in coating stability upon mixing the anti-staining agent with an emulsion resin coating and but also in anti-staining properties. Disclosed is an aqueous coating composition comprising, as essential components, a synthetic resin emulsion (A) having a pH value of 4.0 to 10.0 and a neutral silica sol (B) having a particle diameter of 1 to 200 nm and a pH value of 5.0 to less than 8.5, wherein the neutral silica sol (B) component is contained in an amount of 0.1 to 50 parts by weight in terms of solid content relative to 100 parts by weight of the solid content of the synthetic resin emulsion (A).

10 Claims, No Drawings

AQUEOUS COATING COMPOSITION

This application is the U.S. National Phase under 35 U.S.C. §371 of International Application PCT/JP2004/019361, filed Dec. 24, 2004, which claims priority to Japanese Patent Application No. 2003-430064, filed Dec. 25, 2003, No. 2004-199898, filed Jul. 6, 2004, No. 2004-199899, filed Jul. 6, 2004, and No. 2004-199900, filed Jul. 6, 2004. International Application was not published under PCT Article 21(2) in English.

TECHNICAL FIELD

The present invention relates to an aqueous coating composition having excellent anti-staining properties. The composition of the present invention can be used in surface finishing of various materials such as metal, glass, porcelain tile, concrete, siding board, extrusion-molded plate, plastic etc., and used mainly in protection of bodies such as buildings, civil engineering structures.

BACKGROUND ART

In recent years, it is required to convert a solvent-type coating which contains an organic solvent into an aqueous coating with water as solvent in the field of coatings used in buildings and civil engineering structures. This is carried out for the purpose of reducing damage to the health of painting workers and habitants or reducing the atmospheric and environmental pollution, and use of the aqueous coating is increasing year by year.

Among the known coatings, there are coatings having performance at the same level with respect to weatherability, water resistance etc. as that of the solvent-type coatings. However, when attention is paid particularly to anti-staining properties, the level of the aqueous coatings even regarded as low staining is far from that of the solvent-type low-staining coatings at present.

A coating film of the aqueous coating tends to be poor in coating film hardness and highly stainable upon contacting with a staining substance, as compared with a coating film of a general solvent-type coatings. It follows that once a staining substance adheres thereto, its stain is often hardly removed from the surface of the coating film.

With respect to the solvent-type low-staining coating which can be used in buildings/civil engineering structures, a technology of compounding a coating with organosilicate and/or its condensate (referred to hereinafter as "organosilicate etc.") is disclosed (WO94/06870). The technology of WO94/06870 comprises compounding an organic solvent-type coating with organosilicate etc., and treating its coating film with an acid thereby hydrophilizing the surface of the coating film to attain performance of making oily staining substance hardly adhering thereto and allowing adhered staining substance to be washed away with water droplets of rain or the like.

The organosilicate etc. used in the coating described in WO94/06870 supra have an alkoxysilyl group having reactivity with water, and upon addition to an aqueous coating, cannot regulate the hydrolysis condensation reaction of organosilicate etc., thus increasing the viscosity of the coating rapidly in a short time and further gelling the whole of the coating to cause a problem of hindering the coating operation, and also have a problem of generating aggregates after mixing the aqueous coating with organosilicate etc. because of poor compatibility therebetween. Due to this poor compatibility, a highly glossy aqueous coating called "glossy coating" particularly has a problem of extreme reduction in surface gloss. Even if organosilicate etc. are mixed with an aqueous coating and immediately used in forming a coating film, there is a disadvantage of failure to attain sufficient anti-staining properties. Particularly in an initial stage of formation of the coating film, there arises a problem of easier adhesion of staining substance due to the stickiness of organosilicate etc.

JP-A No. 2003-128998 describes an aqueous coating comprising a synthetic resin emulsion and aggregate such as ground products of natural stone, wherein organosilicate etc. are mixed as an anti-staining agent for the purpose of improving its anti-staining properties, but even this coating also has the same problem as in WO94/06870 supra. Particularly, the coating in JP-A No. 2003-128998 has another problem of deterioration in the vividness of the coating film.

As an aqueous coating for solving these problems, a coating wherein an alkoxysilane condensate having a polyoxyalkylene group is used as an anti-staining agent is known (WO99/05228). The aqueous anti-staining coating described in WO99/05228 is a coating of two-pack type consisting of an emulsion resin coating and an alkoxysilane condensate having a polyoxyalkylene group, wherein the compatibility of the alkoxysilane condensate with the emulsion resin coating has been improved.

DISCLOSURE OF INVENTION

Problems to be Solved by the Invention

In the aqueous anti-staining coating described in WO99/05228 supra, a polyoxyalkylene group is incorporated to an anti-staining agent thereby improving the compatibility between the alkoxysilane condensate and the emulsion coating, and the formed coating film is relatively excellent in gloss and also has anti-staining properties.

In the aqueous anti-staining coating described in WO99/05228 supra, however, the polyoxyalkylene group-containing alkoxysilane condensate has a remaining alkoxysilyl group having reactivity with water and does not significantly change hydrolysis condensation reactivity. For distribution in the market, therefore, the aqueous anti-staining coating in WO99/05228 supra should be a two-pack type coating wherein the emulsion resin coating and the alkoxysilane condensate as an anti-staining agent are packed as separate components to be mixed with each other just before application, and the alkoxysilane condensate having reactivity with water should be in such a special storage form as not to absorb water, so there has been need for improvement.

The present invention was made in view of such problems, and the object of the present invention is to provide an aqueous coating composition, which can simplify storage of an anti-staining agent and is excellent not only in stability of coating upon mixing the anti-staining agent with an emulsion resin coating but also in anti-staining properties.

Means for Solving the Problems

The present inventors made extensive study for solving these problems, and as a result, they found that an aqueous coating composition comprising a specific synthetic resin emulsion and neutral silica sol as essential components is an aqueous coating composition excellent in stability and also in anti-staining properties, and the present invention was thereby completed.

That is, the present invention relates to the following aqueous coating compositions:

1. An aqueous coating composition comprising, as essential components, a synthetic resin emulsion (A) having a pH value of 4.0 to 10.0 and a neutral silica sol (B) having a particle diameter of 1 to 200 nm and a pH value of 5.0 to less than 8.5, wherein the neutral silica sol (B) component is contained in an amount of 0.1 to 50 parts by weight in terms of solid content relative to 100 parts by weight of the solid content of the synthetic resin emulsion (A).
2. The aqueous coating composition according to the above-mentioned 1, which further comprises aggregate (E) having a particle diameter of 0.05 to 5 mm in an amount of 100 to 4000 parts by weight relative to 100 parts by weight of the solid content of the synthetic resin emulsion (A).
3. The aqueous coating composition according to the above-mentioned 1, which further comprises a coloring pigment (C), an extender pigment (D), and aggregate (E) having a particle diameter of 0.05 to 5 mm such that 1 to 300 parts by weight of the coloring pigment (C), 10 to 1000 parts by weight of the extender pigment (D) and 10 to 2000 parts by weight of the aggregate (E) are contained per 100 parts by weight of the solid content of the synthetic resin emulsion (A).
4. The aqueous coating composition according to the above-mentioned 1, which further comprises at least one kind of colored coating (F) dispersed in a granular state.
5. The aqueous coating composition according to any one of the above-mentioned 1 to 4, wherein the neutral silica sol has been subjected to hydrophobation treatment.

EFFECT OF THE INVENTION

In the aqueous coating composition of the present invention having the constitution described above, the viscosity of the coating can be prevented from increasing, thus facilitating handling of the composition to improve the efficiency of the coating operation. Upon application as a glossy coating, a coating film of high gloss can be obtained.

A coating film formed from the aqueous coating composition of the present invention exhibits excellent anti-staining properties. Particularly, the coating film is characterized in that staining substance hardly adhere thereto even in an initial stage of formation of the coating film.

According to the present invention, the storage form of the anti-staining agent (B) can be simplified even if the coating solution is prepared as a coating of two-pack type consisting of the component (B) (that is, an anti-staining agent) and the emulsion resin coating, and it is also possible to design an anti-staining coating of one-pack type consisting of the components (A) and (B) previously mixed with each other.

The aqueous coating composition of the present invention can be used not only for a clear coating, a glossy coating and a flatting coating but also for a natural stone-like coating material, a thin finishing coating material, a thick finishing coating material, a multicolor design coating, etc. That is, a natural stone-like coating material excellent in coating stability and coating film anti-staining properties can be obtained according to the above invention 2. Also, a thin finishing coating material or a thick finishing coating material giving various textures such as those of a sand wall, an orange peel, a fiber wall, stucco, ripples etc. can be obtained according to the above invention 3. And a multicolor design coating excellent in coating stability and coating film anti-staining properties can be obtained according to the above invention 4.

BEST MODE FOR CARRYING OUT THE INVENTION

<Component (A)>

The component (A) constituting the present invention is a synthetic resin emulsion having a pH value of 4.0 to 10.0 (referred to hereinafter as "component (A)"). The component (A) serves as a binder.

The pH value of the component (A) is usually 4.0 to 10.0, preferably 5.0 to 9.5, more preferably 6.0 to 9.0, still more preferably 7.0 to 8.5. The component (A) of such pH value can be used to secure good coating stability even upon mixing with the component (B). When the pH value is outside of the range described above, the component (A) when mixed with the component (B) described later may generate aggregates or increase coating viscosity in a short time. In an extreme case, the coating may be gelled.

As the component (A), various synthetic resin emulsions can be used insofar as the pH value is in the range defined above. Specific examples include acrylic resin-based emulsion, acryl silicone resin-based emulsion, fluorine resin-based emulsion, and urethane resin-based emulsion.

[Acrylic Resin-Based Emulsion]

As the acrylic resin-based emulsion, an emulsion obtained by radical polymerization of an acrylic monomer or by radical copolymerization of an acrylic monomer with another monomer copolymerizable therewith can be used.

The acrylic monomer is not particularly limited, and can be exemplified by, for example, alkyl group-containing (meth)acrylic monomers such as methyl(meth)acrylate, ethyl(meth)acrylate, n-butyl(meth)acrylate, i-butyl(meth)acrylate, 2-ethylhexyl(meth)acrylate, cyclohexyl(meth)acrylate etc.; hydroxyl group-containing (meth)acrylic monomers such as 2-hydroxyethyl (meth)acrylate etc.; ethylenically unsaturated carboxylic acids such as (meth)acrylic acid etc.; amino group-containing (meth)acrylic monomers such as dimethyl aminoethyl(meth)acrylate, dimethyl aminopropyl(meth)acrylate etc.; amide group-containing (meth)acrylic monomers such as (meth)acrylamide, ethyl(meth)acrylamide etc.; nitrile group-containing (meth)acrylic monomers such as acrylonitrile etc.; and epoxy group-containing (meth)acrylic monomers such as glycidyl(meth)acrylate etc. ("(meth)acryl" refers to both "acryl" and "methacryl")

Another monomer copolymerizable with the acrylic monomer includes aromatic hydrocarbon-based vinyl monomers such as styrene, methyl styrene, chlorostyrene, vinyl toluene etc.; α,β-ethylenically unsaturated carboxylic acids such as maleic acid, itaconic acid, crotonic acid, fumaric acid, citraconic acid etc.; sulfonic acid-containing vinyl monomers such as styrenesulfonic acid, vinylsulfonic acid etc.; acid anhydrides such as maleic anhydride, itaconic anhydride etc.; chlorine-containing monomers such as vinyl chloride, vinylidene chloride, chloprene etc.; hydroxyl group-containing alkyl vinyl ethers such as hydroxyethyl vinyl ether, hydroxypropyl vinyl ether etc.; alkylene glycol monoallyl ethers such as ethylene glycol monoallyl ether, propylene glycol monoallyl ether, diethylene glycol monoallyl ether etc.; α-olefins such ethylene, propylene, isobutylene etc.; vinyl esters such as vinyl acetate, vinyl propionate, vinyl butyrate, vinyl pivalate etc.; vinyl ethers such as methyl vinyl ether, ethyl vinyl ether, butyl vinyl ether, cyclohexyl vinyl ether etc.; and allyl ethers such as ethyl allyl ether, butyl allyl ether etc.

Use of the acrylic resin-based emulsion as synthetic resin emulsion is advantageous in respect of durability, cost, and high freedom of design of the resin.

[Acrylic Silicon Resin-Based Emulsion]

As the acrylic silicon resin-based emulsion, an emulsion obtained by radical polymerization of a silicon-containing acrylic monomer or by radical copolymerization of a silicon-containing acrylic monomer with another monomer copolymerizable therewith can be used.

The silicon-containing acrylic monomer is not particularly limited, and can be exemplified by, for example, hydrolyzable silyl group-containing vinyl monomers such as γ-(meth)acryloxypropyltrimethoxy silane, γ-(meth)acryloxypropyltriethoxy silane, γ-(meth)acryloxypropylmethyldimethoxy silane, γ-(meth)acryloxypropylmethyldiethoxy silane etc.

As another monomer copolymerizable with the silicone-containing acrylic monomer, the monomers used in the acrylic resin-based emulsion described above can be used without particular limitation.

Use of the acrylic silicon resin-based emulsion as synthetic resin emulsion is advantageous in respect of excellent weatherability, yellowing resistance, durability, chemical resistance, anti-staining properties etc.

[Fluorine Resin-Based Emulsion]

As the fluorine resin-based emulsion, an emulsion obtained by radical copolymerization of a fluorine-containing monomer or by radical copolymerization of a fluorine-containing monomer with another monomer copolymerizable therewith can be used.

Examples of the fluorine-containing monomer include, for example, fluoroolefins such as vinylidene fluoride, trifluoroethylene, tetrafluoroethylene, pentafluoroethylene, hexafluoropropylene etc., and fluorine-containing (meth)acrylates such as trifluroethyl(meth)acrylate, pentafluoropropyl(meth)acrylate, perfluorocyclohexyl(meth)acrylate etc.

As another monomer copolymerizable with the fluorine-containing monomer, the monomers used in the acrylic resin-based emulsion described above can be used without particular limitation.

Use of the fluorine resin-based emulsion as synthetic resin emulsion is advantageous in respect of excellent weatherability, yellowing resistance, durability, chemical resistance, anti-staining properties etc.

[Urethane Resin-Based Emulsion]

The urethane resin-based emulsion is a generic name for emulsions which after formation of a coating film, have urethane bond in the coating film. That is, the urethane resin-based emulsion may have urethane bond before forming a coating film, or may form urethane bond by reaction after formation of a coating film. The emulsion may be either one-pack type or two-pack type.

The method of producing the one-pack type urethane resin-based emulsion includes a method of copolymerizing a polymerizable monomer having an urethane linkage with another copolymerizable monomer, a method of polymerizing a polymerizable unsaturated monomer in the presence of an aqueous resin having urethane bond, and a method of mixing an aqueous urethane resin having reactive groups with an emulsion containing groups capable of reacting with the reactive groups.

For the two-pack type emulsion, a combination of a water-dispersible isocyanate and a hydroxyl group-containing emulsion is exemplified.

Use of the urethane resin-based emulsion as synthetic resin emulsion is advantageous in excellent durability, solvent resistance, chemical resistance, anti-staining properties.

[Other Crosslinkable Type Emulsions]

Among synthetic resin emulsions, emulsions utilizing crosslinking reaction between a carbonyl group and hydrazide group, carboxylic acid and metal ion, epoxy group and amine, epoxy group and carboxyl group, carboxylic acid and aziridine, carboxylic acid and carbodiimide, carboxylic acid and oxazoline or acetoacetate and ketimine, besides the crosslinking reaction between a hydroxyl group and isocyanate compound described above. The crosslinkable type emulsion may be either one-pack type or multi-pack type of two or more components.

Use of the crosslinking reaction type emulsion as synthetic resin emulsion is advantageous in excellent durability, solvent resistance, chemical resistance, anti-staining properties etc.

The component (A) can be produced by a known method insofar as the above-described conditions are satisfied. For example, the component (A) can be produced in an aqueous medium by emulsion polymerization, suspension polymerization, dispersion polymerization, solution polymerization, redox polymerization or the like and can also be produced if necessary in multistage polymerization. For polymerization, an emulsifying agent, an initiator, a dispersant, a chain transfer agent, a buffer agent or other additives can be used if necessary.

<Component (B)>

The component (B) in the present invention is a neutral silica sol having a particle diameter of 1 to 200 nm and a pH value of 5.0 to less than 8.5 (hereinafter referred to as "component (B)").

Particles constituting the component (B) are made of a compound which is formed by hydrolysis condensation of silicate, is highly rigid due to its major silica component, and has silanol groups (Si—OH) on the surfaces of the particles. In the present invention, excellent anti-staining properties can be exhibited by the synergistic action of the hardness and surface functional group of such component (B) particle. Although its specific mechanism is not evident, it is estimated that upon formation of a coating film, the component (B) is oriented on the surface of the coating film to improve the hardness and hydrophilicity of the surface of the coating film.

The particle diameter of the component (B) is usually 1 to 200 nm, preferably 5 to 100 nm, more preferably 10 to 50 nm, still more preferably 10 to 40 nm, in terms of primary particle diameter. When the particle diameter is too large, the external appearance of the formed coating film may be adversely affected so that the clear coating is inferior in the transparency of its coating film, the glossy coating is poor in gloss, and the natural stone-like coating materials are inferior in the vividness of their coating film. When the particle diameter is too small, the resulting composition may fail to attain a sufficient effect in respect of anti-staining properties. The average primary particle diameter of the component (B) is preferably 5 to 100 nm, more preferably 10 to 50 nm, still more preferably 10 to 40 nm. By using two or more kinds of neutral silica sol (B) different in average primary particle diameter in the present invention, the effect of anti-staining properties can be improved. The particle diameter of the component (B) is a value measured by a light scattering method.

The pH value of the component (B) should be 5.0 to less than 8.5 and is preferably 6.0 to less than 8.5, more preferably 6.5 to 8.0, still more preferably 7.0 to 8.0. When the component (B) is regulated in such pH range, the excellent anti-staining effect can be exhibited by silanol groups on the surfaces of its particles. When the pH is outside of the above range, the composition is poor in anti-staining properties and also disadvantageous in respect of water resistance, weatherability etc.

Colloidal silica can be mentioned as being similar to the component (B) in the present invention. Usually, the colloidal silica is divided roughly into acidic silica with pH 2 to 4 and alkaline silica with pH 9 to 11. On the surfaces of particles of either colloidal silica, Si—OH is in a dissociated state. Specifically, Si—OH is in the form of Si—O—.H$^+$ on the surfaces of particles of the acidic colloidal silica. The alkaline colloidal silica is classified into Na type having Si—OH in the form of Si—O—.Na$^+$ and NH$_4$ type having Si—OH in the form of Si—O—.NH$_4^+$ on the surfaces of particles thereof On the other hand, the component (B) in the present invention, which is in such a state that a majority of Si—OH groups remain without dissociation on particle surfaces, is a compound different from the colloidal silica described above. According to the particle surface characteristics of the component (B) in the present invention, excellent performance can be exhibited in respect of physical properties of the coating film, such as water resistance, bleed-out resistance etc.

The electrical conductivity of the component (B) is preferably up to 3 mS/cm (preferably up to 2 mS/cm, more preferably up to 1 mS/cm). As used herein, the electrical conductivity is a value measured by using "Model SC82 Personal SC Meter SC8221-J" (manufactured by Yokogawa Denki Co., Ltd.) (measurement temperature, 25° C.).

By using said component (B), the water resistance, anti-staining properties etc. of the formed coating film can further be improved.

The component (B) can be produced from a silicate compound as the starting material. The silicate compound includes, for example, tetramethoxy silane, tetraethoxy silane, tetra-n-propoxy silane, tetraisopropoxy silane, tetra-n-butoxy silane, tetraisobutoxy silane, tetra-sec-butoxy silane, tetra-t-butoxy silane, tetraphenoxy silane etc. or condensates thereof. In addition, alkoxy silane compounds such as dimethoxydiethoxy silane, methyltrimethoxy silane, methyltriethoxy silane, ethyltrimethoxy silane, ethyltriethoxy silane, dimethyldimethoxy silane, diethyldimethoxy silane etc. can also be simultaneously used. At the time of production, a catalyst etc. can also be used. During or after production, metals contained in the catalyst etc. can be removed by ion exchange treatment.

As the solvent for the component (B), water and/or a water-soluble solvent can be used. The water-soluble solvent includes, for example, alcohols, glycols, glycol ethers etc. Particularly the solvent in the present invention consists desirably of water only. By using such component (B), the coating can be used as a low-volatile organic compound (low VOC). Upon mixing with the component (A), formation of aggregates can be suppressed.

The solid content of the component (B) is usually 5 to 50 wt %, preferably 10 to 40 wt %, more preferably 15 to 30 wt %. When the solid content of the component (B) is within such a range, the stability of the component (B) itself and further the stability of the component (B) upon mixing with the component (A) can be secured. When the solid content is too high, the component (B) itself is made unstable, or upon mixing with the component (A), the coating may be made unstable. When the solid content is too low, a large mount of the component (B) should be mixed to attain sufficient anti-staining effect, which is not practical in design of the coating composition.

In the present invention, the component (B) is preferably a neutral silica sol subjected to hydrophobation treatment (referred to hereinafter as "component (B-1)"). By using such component (B-1), the anti-staining properties can be further improved.

The hydrophobation treatment is carried desirably by complexing a compound having at least one functional group selected from an alkoxy group and a hydroxyl group (referred to hereinafter as "component (p)"), with the neutral silica sol.

As the component (p), a compound having an effect of hydrophobating the neutral silica sol can be used without particular limitation, and examples include the following compounds:

1) Alkoxysilane compounds: tetramethoxysilane, tetraethoxysilane, tetra-n-propoxysilane, tetraisopropoxysilane, tetra-n-butoxysilane, tetraisobutoxysilane, tetra-sec-butoxysilane, tetra-t-butoxysilane, tetraphenoxysilane, dimethoxydiethoxysilane, methyltrimethoxysilane, methyltriethoxysilane, methyltripropoxysilane, methyltributoxysilane, ethyltrimethoxysilane, ethyltriethoxysilane, ethyltripropoxysilane, ethyltributoxysilane, propyltrimethoxysilane, propyltriethoxysilane, propyltripropoxysilane, propyltributoxysilane, butyltrimethoxysilane, butyltriethoxysilane, butyltripropoxysilane, butyltributoxysilane, dimethyldimethoxysilane, dimethyldiethoxysilane, dimethyldipropoxysilane, dimethyldibutoxysilane, diethyldimethoxysilane, diethyldiethoxysilane, diethyldipropoxysilane, diethyldibutoxysilane, hexyltrimethoxysilane, hexyltriethoxysilane, hexyltripropoxysilane, octyltrimethoxysilane, octyltriethoxysilane, octyltripropoxysilane, decyltrimethoxysilane, dodecyltrimethoxysilane, octadecyltrimethoxysilane, phenyltrimethoxysilane, vinyltrimethoxysilane etc.

2) Alcohols: methanol, ethanol, n-propanol, isopropyl alcohol, n-butyl alcohol, n-amyl alcohol, n-hexyl alcohol, 2-ethyl-1-hexanol, n-heptanol, isoheptyl alcohol, n-octanol, 2-octanol, n-nonanol, n-decanol, n-undecyl alcohol, n-dodecyl alcohol, 1,3-butanediol, 1,5-pentanediol, diacetone alcohol etc.

3) Glycols: ethylene glycol, diethylene glycol, triethylene glycol, propylene glycol, dipropylene glycol etc.

4) Glycol ethers: ethylene glycol monomethyl ether, ethylene glycol monoethyl ether, ethylene glycol monopropyl ether, ethylene glycol isopropyl ether, ethylene glycol monobutyl ether, ethylene glycol monomethyl ether acetate, diethylene glycol monomethyl ether, diethylene glycol monoethyl ether, diethylene glycol monoethyl ether acetate, triethylene glycol monomethyl ether, triethylene glycol monoethyl ether, propylene glycol monomethyl ether, propylene glycol monoethyl ether, dipropylene glycol monomethyl ether etc.

5) Fluorine alcohols: trifluoroethanol, pentafluoropropanol, 2,2,3,3-tetrafluoropropanol, 1,1,1,3,3,3-hexafluoroisopropanol, nonafluoro-t-butyl alcohol, 1,1,3,3-tetrafluoroisopropanol, 1,1-bis(trifluoromethyl)ethanol, 1,1,1,3,3,4,4,4-octafluoro-2-butanol, 2,2,3,3,3-pentafluoro-1,1-bis(trifluoromethyl)propanol, 2,2,2-trifluoro-1-(trifluoromethyl)-1-triethanol etc.

Among the compounds illustrated above, the component (p) is particularly preferably fluorine alcohol.

The component (p) is mixed desirably in a ratio of 0.01 to 50 parts by weight (preferably 0.02 to 30 parts by weight, more preferably 0.05 to 10 parts by weight) relative to 100 parts by weight of the solid content of the neutral silica sol. With such a ratio given, anti-staining properties can be sufficiently improved.

When the component (p) is mixed with the neutral silica sol, the component (p) may be diluted if necessary with water, a water-soluble solvent, etc. When the neutral silica sol (B) is hydrophobated by mixing with the component (p), a catalyst can be used if necessary.

When the neutral silica sol is hydrophobated with the component (p), the neutral silica sol can be hydrophobated by complexing it with a mixture of the component (p) and a silane coupling agent. Alternatively, the neutral silica sol can be hydrophobated by treating it with a silane coupling agent and then mixing it with the component (p). As the silane coupling agent in this case, a silane coupling agent having a functional group capable of reacting with the component (p) can be used. For example, when the component (p) is fluorene alcohol, an amino group-containing silane coupling agent, an isocyanate group-containing silane coupling agent etc. can be used.

The lower limit of the temperature at which the neutral silica sol (B) is mixed and treated with the component (p) is 10° C. or more, and is desirably set at preferably 20° C. or more, more preferably 40° C. or more, and the upper limit is set desirably at 200° C. or less, preferably 120° C. or less, more preferably 100° C. or less. Setting of the temperature in such range is preferable in respect of increase in the reactivity between the component (p) and the neutral silica sol and in exhibiting the anti-staining effect. The heating time is not particularly limited, and is usually 1 to 24 hours or so.

In the present invention, anti-staining properties can be improved by using the neutral silica sol complexed with a polyoxyalkylene group-containing compound. The polyoxyalkylene group-containing compound (referred to hereinafter as "component (q)") is preferably a compound having a polyoxyalkylene group and at least one kind of functional group selected from an alkoxyl group and a hydroxyl group.

Such component (q) includes, for example, polyoxyethylene glycol, polyoxyethylene glycol monoalkyl ether, polyoxyethylene-propylene glycol, polyoxyethylene-tetramethylene glycol, polyoxyethylene glycol diglycidyl ether, polypropylene glycol diglycidyl ether, polyoxyethylene diglycolic acid, polyoxyethylene glycol vinyl ether, polyoxyethylene glycol allyl ether, polyoxyethylene glycol diallyl ether, polyoxyethylene alkyl ether, polyoxyethylene sorbitan fatty acid ester, polyoxyethylene fatty acid ester, polyoxyethylene alkyl amine etc. The average molecular weight of the component (q) is usually about 150 to 2000.

For complexing the neutral silica sol with the component (q), the neutral silica sol may be mixed with the component (q) and heated if necessary. The mixing ratio of the component (q) is desirably in a ratio of 0.01 to 50 parts by weight (preferably 0.02 to 30 parts by weight, more preferably 0.05 to 10 parts by weight) relative to 100 parts by weight of the solid content of the neutral silica sol. The lower limit of the heating temperature may be set at 10° C. or more (preferably 20° C. or more, more preferably 40° C. or more) and the upper limit at 200° C. or less (preferably 120° C. or less, more preferably 100° C. or less). The heating time is not particularly limited, and is usually 1 to 24 hours or so.

The component (B) in the present invention is particularly preferably a neutral silica sol which has been subjected to hydrophobation treatment and complexed with the polyoxyalkylene group-containing compound (q). By using such neutral silica sol, the anti-staining properties of the formed coating film can further been improved.

When two or more kinds of neutral silica sol different in average primary particle diameter are used as the component (B) in the present invention, at least one kind of neutral silica sol has been desirably subjected to hydrophobation treatment. Further, at least one kind of neutral silica sol has been more desirably subjected to hydrophobation treatment and complexed with the component (q).

The mixing ratio of the component (B), in terms of solid content, is usually 0.1 to 50 parts by weight, preferably 0.5 to 20 parts by weight, more preferably 1 to 15 parts by weight, relative to 100 parts by weight of the solid content of the component (A). With such a ratio given, the effect of the present invention can be sufficiently exhibited. When the content of the component (B) is too low, sufficient anti-staining properties cannot be obtained. When the component (B) is too high, the coating film easily cracks, and in the case of the glossy coating, a highly glossy coating film is hardy obtained.

<Components (C) to (F)>

The aqueous coating composition of the present invention can be mixed not only with the components described above but also with a coloring pigment (C), an extender pigment (D), aggregate (E) and other components usable usually in coatings, such as a film forming assistant, a plasticizer, an anti-freezing agent, a preservative, an anti-fungus agent, an antibacterial agent, a defoaming agent, a pigment dispersant, a thickener, a leveling agent, a moistening agent, a pH adjusting agent, fibers, a flatting agent, an UV absorber, an antioxidant, a light stabilizer, an absorbent, a catalyst, a crosslinking agent etc.

Among these components, the coloring pigment (C) (referred to hereinafter as component (C)) can be the pigment generally compounded into coatings. Specific examples include titanium oxide, zinc oxide, carbon black, lamp black, bone black, graphite, black iron oxide, copper chrome black, cobalt black, copper manganese iron black, red oxide, molybdate orange, permanent red, permanent carmine, anthraquinone red, perylene red, quinacridone red, yellow iron oxide, titanium yellow, fast yellow, benzimidazolone yellow, chrome green, cobalt green, phthalocyanine green, ultramarine, Prussian blue, cobalt blue, phthalocyanine blue, quinacridone violet, dioxazine violet, aluminum pigment, pearl pigment etc., and one or more thereof can be used.

The extender pigment (D) (referred to hereinafter as "component (D)") includes, for example, heavy calcium carbonate, light calcium carbonate, kaolin, clay, kaolinite, china clay, diatomaceous earth, water-containing finely divided silicic acid, talc, barite powder, barium sulfate, precipitated barium sulfate, barium carbonate, magnesium carbonate, silica powder and aluminum hydroxide, and one or more thereof can be used.

The particle diameter of the component (D) is usually less than 50 µm (preferably 0.5 to less than 50 µm, more preferably 1 to 30 µm).

As the aggregate in the present invention, aggregate (E) having a particle diameter of 0.05 to 5 mm (referred to hereinafter as "component (E)") can be used. Particularly the component (E) used is preferably at least one member selected from natural aggregate such as natural stone, ground products of natural stone, etc. and artificial aggregate such as colored aggregate. Specific examples include, for example, marble, granite, serpentinite, granite, fluorite, white marble, feldspar, limestone, silica rock, siliceous sand, macadam, mica, siliceous shale, and ground products thereof, ground pottery, ground ceramics, ground glass, glass beads, ground resin, resin beads, rubber particles, metal particles etc. Ground products of shells, coral, wood, carbon, activated carbon etc. can also be used. These materials coated with a colored coating by surface treatment with a pigment, dye, glaze etc. can also be used.

When a coating of one-pack type is designed in the present invention, polyoxyalkylene oxide chain-containing compounds, aminoalcohol compounds etc. are preferably added. The aminoalcohol compounds include 1-aminoethanol, 2-aminoethanol, 1-amino-2-propanol, 2-amino-1-propanol, 3-amino-1-propanol, 2-amino-2-methyl-1-propanol, 2-(methylamino)-2-methyl-1-propanol, N,N-dimethylethanolamine, N,N-diethylethanolamine, N-(2-aminoethyl)ethanolamine, N-methyl ethanolamine, N-methyl diethanolamine etc. By adding such compound, the stability of the coating and the gloss and vividness of the coating film can be improved.

In the present invention, coatings in various forms can be designed by combining and mixing the components described above. Specific forms of the coatings include, for example, a clear coating, a glossy coating, a flatting coating, a natural stone-like coating material, a thin finishing coating material, a thick finishing coating material and a multicolor design coating. The coatings in any forms can be formed in a usual manner by mixing the respective components, and the order of compounding the respective components is not particularly limited insofar as the respective coatings can be finally produced.

1) Clear Coating

The clear coating contains the components (A) and (B) as essential components, and its formed coating film has transparency. The clear coating can be colored with the coloring pigment (C) etc. in such a range that the transparency of the formed coating film can be secured. The gloss of the formed coating film can be regulated by the extender pigment (D) etc.

2) Glossy Coating

The glossy coating is a coating capable of forming a colored and glossy coating film, and contains the component (A), the component (B) and the coloring pigment (C) as the essential components. The glossy coating is prescribed in JIS K5660 "Glossy Synthetic Resin Emulsion Paint", and its specular gloss is 70 or more (preferably 75 or more, more preferably 80 or more). The glossy coating can show a desired color by suitably establishing the type and compounding ratio of the component (C).

The mixing ratio of the component (C) in the glossy coating varies depending on the type of the component (C), but is usually 3 to 150 parts by weight, preferably 5 to 100 parts by weight, relative to 100 parts by weight of the solid content of the component (A).

A coating material of thick film type can also be designed by mixing such glossy coating with the extender pigment (D) etc. in such a range as not to deteriorate gloss.

3) Flatting Coating

The flatting coating is a coating capable of forming a colored coating film whose gloss is reduced, and contains the component (A), the component (B), the coloring pigment (C) and the extender pigment (D) as essential components. The specular gloss of a coating film formed from the flatting coating is usually 40 or less (preferably 20 or less, more preferably 10 or less). The gloss of the flatting coating can regulated suitably according to the type, particle diameter, mixing ratio etc. of the component (D) used. By such regulation, coatings with 30% gloss, 50% gloss etc. in addition to those generally called flatting coatings can be designed.

The mixing ratio of the component (C) in the flatting coating is usually 3 to 500 parts by weight, preferably 5 to 400 parts by weight, relative to 100 parts by weight of the solid content of the component (A). The mixing ratio of the component (D) can be suitably established depending on a desired degree of gloss, but is usually 10 to 1000 parts by weight, preferably 50 to 800 parts by weight, relative to 100 parts by weight of the solid content of the component (A).

4) Natural Stone-Like Coating Material

The natural stone-like coating material can be obtained by using, as essential components, the component (A), the component (B) and the aggregate (E) having a particle diameter of 0.05 to 5 mm. This natural stone-like coating material can show various colors by using a suitable combination of two or more kinds of component (E).

In the natural stone-like coating material, the component (E) is mixed in a ratio of usually 100 to 4000 parts by weight, preferably 150 to 3000 parts by weight, more preferably 200 to 2000 parts by weight, relative to 100 parts by weight of the solid content of the component (A). The mixing ratio of the component (E) in such a range is preferable in design, anti-staining properties etc. of the formed coating film. When the component (E) is too low, it is difficult to produce a coating that exhibits a natural stone-like design. When the component (E) is too high, contaminants can easily enter into the formed coating film to deteriorate the anti-staining effect.

The natural stone-like coating material can be mixed if necessary with the coloring pigment (C). When the coating material is mixed with a large amount of the component (C), the design by coloration of the component (E) is deteriorated, and thus it is desired that the mixing ratio of the coloring component (C) is usually less than 1 part by weight (preferably 0.5 part by weight or less).

5) Thin Finishing Coating Material/Thick Finishing Coating Material

In the present invention, coating materials generally called lysine, stucco etc. can be designed by using, as essential components, the component (A), the component (B), the coloring pigment (C), the extender pigment (D), and the aggregate (E) having a particle diameter of 0.05 to 5 mm. Such lysine and stucco are classified respectively into "thin finishing coating material" and "thick finishing coating material" in JIS A6909 "Finish Coating Materials for Building".

Such coating material can give a coating film of desired hue by suitably regulating the type and amount of the component (C) compounded. The mixing ratio of the component (C) is usually 1 to 300 parts by weight, preferably 2 to 200 parts by weight, more preferably 3 to 150 parts by weight, relative to 100 parts by weight of the solid content of the component (A).

The component (D) is a component acting mainly as an extender and working effectively in formation of a thick coating film. The mixing ratio of the component (D), in terms of solid content, is usually 10 to 1000 parts by weight, preferably 20 to 500 parts by weight, more preferably 30 to 300 parts by weight, relative to 100 parts by weight of the solid content of the component (A).

The component (E) is mixed in a ratio of usually 10 to 2000 parts by weight, preferably 30 to 1500 parts by weight, more preferably 50 to 1000 parts by weight, relative to 100 parts by weight of the solid content of the component (A). The mixing ratio of the component (E) in such a range is preferable in respect of design, anti-staining properties etc. of the formed coating film.

6) Multicolor Design Coating

The multicolor design coating is a coating composition capable of showing a multicolor pattern by single application, and is classified generally into (1) an oil-in-water type (O/W type), (2) a water-in-oil type (W/O type), (3) an oil-in-oil type (O/O type) and (4) a water-in-water type (W/W type). In the present invention, a multicolor design coating of oil-in-water type (O/W type) or water-in-water type (W/W type) whose dispersing medium is aqueous can be designed.

The multicolor design coating in the present invention is obtained by dispersing at least one kind of colored coating (F) in a granular state in an aqueous dispersing medium containing the component (A) and the component (B) in amounts of 100 parts and 0.1 to 50 parts by weight respectively in terms of solid content.

Among these components, the colored coating (F) contains resin, the coloring pigment (C) and if necessary various additives. The colored coating (F) can be obtained by uniformly mixing these components. In this case, a diluent (water or solvent) depending on the type of the colored coating (F) can also be suitably used.

The resin in the colored coating (F) may be resin acting as a vehicle of the coating, and known resin can be used without particular limitation. Examples of such resin include acryl, urethane, vinyl acetate, acryl vinyl acetate, acryl urethane, acryl silicon, fluorine, polyvinyl alcohol, bio gum, galactomannan derivatives, alginic acid derivatives, cellulose derivatives etc. The form of these resins may be solvent-soluble resin, non-water-dispersible resin, water-soluble resin or water-dispersible resin. These resins may have functional groups crosslinkable by a curing agent or a curing catalyst.

When the resin is solvent-soluble resin and/or non-aqueous dispersion resin, the solvent type colored coating (F) is obtained, and can be dispersed in an aqueous dispersing medium to form a multicolor design coating of oil-in-water type (O/W type). When the resin is water-soluble resin and/or aqueous dispersion resin, the aqueous colored coating (F) is obtained, and can be dispersed in an aqueous dispersing medium to form a multicolor design coating of water-in-water type (W/W type).

The method of dispersing the colored coating (F) in a granular state is not particularly limited, and known methods can be used. Specific production methods used include, for example:

a method comprises dispersing the colored coating (F) into an aqueous dispersing medium containing the component (A), the component (B) and a dispersion stabilizer;

a method comprises dispersing the colored coating (F) into an aqueous dispersing medium containing the component (A) and a dispersion stabilizer and then mixing the resulting dispersion with the component (B); and a method comprises dispersing the colored coating (F) into an aqueous dispersing medium containing a dispersion stabilizer etc. and then mixing the resulting dispersion with the components (A) and (B).

By any of these methods, the multicolor design coating wherein colored particles formed from the colored coating (F) are dispersed in an aqueous dispersing medium containing the components (A) and (B) as essential components can be finally obtained. The shape of the colored particles is not particularly limited and may be either a type having the colored coating (F) included in a liquid state or a type having the whole colored particles gelled. The aqueous dispersing medium may have transparency in such a degree as not to inhibit the coloring properties of the colored particles.

The dispersion stabilizer described above is a component stabilizing the colored coating (F) stably in a granular state, and can be selected depending on the type etc. of the colored coating (F). Specific examples of the dispersion stabilizer include, for example, a component acting as a crosslinking agent for the colored coating (F). Such component includes, for example, epoxides, isocyanates, amines, alkoxy silane, organic titanates, aluminum chelates, magnesium salts, calcium salts, barium salts, aluminum salts, sodium salts, potassium salts, borates, phosphates etc. As other dispersion stabilizers, it is also possible to use polyvinyl alcohol, polyacrylic acid, polyethylene oxide, methyl cellulose, ethyl cellulose, hydroxyethyl cellulose, carboxymethyl cellulose, casein, cellulose acetate phthalate, bentonite, gelatin, sodium alginate, gum arabic, pectin, xanthane gum, starch etc.

For regulation of the particle diameter and shape of colored particles formed from the colored coating (F), shape of an agitating blade, size and position of the agitating blade relative to an agitating bath, speed of rotation of the agitating blade, viscosity of the colored coating (F), addition method and concentration of the dispersion stabilizer, viscosity of the aqueous dispersing medium may be suitably selected and regulated.

The particle diameter of the colored particles is not particularly limited, but is usually 0.01 to 10 mm (preferably 0.1 to 5 mm) or so.

The multicolor design coating in the present invention desirably contains two or more kinds of colored particles different in hue in order to produce a coating which may exhibit various multicolor pattern. The hue of the colored particles can be suitably established depending on a desired pattern coating. The colored particles can also contain transparent particles.

The mixing ratio of the colored particles is not particularly limited, but is usually 50 to 1000 parts by weight (preferably 100 to 900 parts by weight) relative to 100 parts by weight of the solid content of the component (A) in the aqueous dispersing medium.

The aqueous coating composition of the invention described above can be used in surface finishing of various materials such as concrete, mortar, siding board, extrusion-molded plate, plastic, plywood, metal, glass, porcelain tile etc. Particularly, the aqueous coating composition can be preferably used in protection of buildings and civil engineering structures and for beautiful appearances thereof. In this case, the aqueous coating composition of the present invention is used on the final face and can be directly applied onto a base material or can be applied onto a surface subjected to any surface treatment (sealer treatment, filler treatment, surfacer treatment, putty treatment etc.).

As the coating method, various methods such as brush coating, spray coating, roller coating, trowel coating etc. can be used. When building materials are coated in a factory, they can be coated by a roll coater, flow coater etc.

In the application of such a natural stone-like coating material, a thin finishing coating material or a thick finishing coating material, various surface patterns can be formed by suitably selecting the type of coater and the method of using the same. The surface pattern is for example in a sand wall state, orange peel state, ripple state, stucco state, embossed state, moon's surface state, combed state, vermiculated state etc. The surface pattern may be regulated such that its height is in the range of approximately 0.2 to 5 mm. The coater in this case is for example a spray, a roller, a trowel, a brush etc. A combination of these coaters may also be used. While the coating film remains wet after application, the surface pattern can also be formed by a design roller, a design brush, a comb, a pallet, a trowel etc.

The amount of the composition of the invention applied may be suitably selected depending on the type and use of the coating and is for example about 0.1 to 0.5 kg/m$^2$ as a clear coating, glossy coating or flatting coating, or about 0.5 to 10 kg/m$^2$ as a natural stone-like coating material, thin finishing coating material or thick finishing coating material, or about 0.2 to 1.6 kg/m$^2$ as a multicolor design coating. The coating when applied can be diluted with water or the like to regulate the viscosity of the coating suitably. The degree of dilution is usually about 0 to 20 wt %.

After application, the composition of the present invention may be dried usually at ordinary temperatures, but may be dried if necessary under suitable heating.

EXAMPLES

Hereinafter, the features of the present invention are further clarified by reference to the Examples. In the Examples, the respective starting materials shown below were used to prepare coatings.

Emulsion A: Acrylic resin emulsion (methyl methacrylate/styrene/2-ethylhexyl acrylate/methacrylic acid copolymer, pH 7.5, solid content of 50 wt %, minimum film forming temperature 25° C.)

Emulsion B: Acrylic resin emulsion (methyl methacrylate/styrene/cyclohexyl methacrylate/2-ethylhexyl acrylate/methacrylic acid copolymer, pH 7.4, solid content 50 wt %, minimum film forming temperature 22° C.)

Emulsion C: Acrylic resin emulsion (styrene/methyl methacrylate/2-ethylhexyl acrylate copolymer, minimum film forming temperature 20° C., pH 7.8, solid content 50 wt %)
Water-soluble resin A: Hydroxyethyl cellulose powder
Water-soluble resin B: 3 wt % Aqueous solution of galactomannan
Coloring pigment: Titanium oxide dispersion (solid content 70 wt %)
Dispersant A: Styrene/maleic acid copolymer
Dispersant B: Polyoxyalkylene-based compound
Film forming assistant: 2,2,4-Trimethyl-1,3-pentanediol monoisobutyrate
Thickener: Polyurethane-based thickener
Defoaming agent: Silicone-based defoaming agent
Anti-staining agent A: Neutral silica sol (pH 7.6, solid content 20 wt %, average primary particle diameter 27 nm, electrical conductivity 0.6 mS/cm)
Anti-staining agent B: See Synthesis Example 1.
Anti-staining agent C: See Synthesis Example 2.
Anti-staining agent D: See Synthesis Example 3.
Anti-staining agent E: See Synthesis Example 4.
Anti-staining agent F: See Synthesis Example 5.
Anti-staining agent G: Neutral silica sol (pH 7.8, solid content 12 wt %, average primary particle diameter 12 nm, electrical conductivity 0.3 mS/cm)
Anti-staining agent H: Basic colloidal silica (pH 9.5, solid content 20 wt %, average primary particle diameter 20 nm, electrical conductivity 1.7 mS/cm)
Anti-staining agent I: Ethyl silicate condensate (average molecular weight 750)
Catalyst: Dibutyltin dilaurate
Aggregate A: Colored aggregate mixture having a particle diameter of 0.1 to 2 mm (white:gray:black=3:3:1)
Aggregate B: White marble having a particle diameter of 0.1 to 0.3 mm.

Synthetic Example 1

A reaction container equipped with a reflex condenser and an agitating blade was charged with 500 parts by weight of the anti-staining agent A, and 0.3 part by weight of trifluoroethanol was added dropwise under stirring. Then, the mixture was heated to 80° C., stirred for 24 hours and then cooled to room temperature to give the anti-staining agent B.

Synthetic Example 2

A reaction container equipped with a reflex condenser and an agitating blade was charged with 500 parts by weight of the anti-staining agent A, and 1.0 part by weight of tetramethoxy silane was added dropwise under stirring. Then, the mixture was heated to 80° C., stirred for 24 hours and then cooled to room temperature to give the anti-staining agent C.

Synthetic Example 3

A reaction container equipped with a reflex condenser and an agitating blade was charged with 500 parts by weight of the anti-staining agent A, and 1.0 part by weight of methyltrimethoxy silane was added dropwise under stirring. Then, the mixture was heated to 80° C., stirred for 24 hours and then cooled to room temperature to give the anti-staining agent D.

Synthetic Example 4

A reaction container equipped with a reflex condenser and an agitating blade was charged with 500 parts by weight of the anti-staining agent A, and 0.3 part of trifluoroethanol was added dropwise under stirring and then 0.15 part by weight of methoxy polyethylene glycol (average molecular weight 200) was added dropwise under stirring. Then, the mixture was heated to 80° C., stirred for 24 hours and then cooled to room temperature to give the anti-staining agent E.

Synthetic Example 5

A reaction container equipped with a reflex condenser and an agitating blade was charged with 500 parts by weight of the anti-staining agent A, and a mixed solution consisting of 0.3 part by weight of trifluoroethanol and 0.3 part by weight of γ-aminopropyl trimethoxy silane was added dropwise under stirring. Then, the mixture was heated to 80° C., stirred for 24 hours and then cooled to room temperature to give the anti-staining agent F.

Test Example 1

Glossy Coating

<Production of the Coating>
According to the compositions in Table 1, the respective starting materials were uniformly mixed in a usual manner to produce each coating. The compounding amounts in Table 1 are expressed in parts by weight.

TABLE 1

| | Example 1-1 | Example 1-2 | Example 1-3 | Example 1-4 | Example 1-5 | Example 1-6 | Example 1-7 | Comparative Example 1-1 | Comparative Example 1-2 | Comparative Example 1-3 |
|---|---|---|---|---|---|---|---|---|---|---|
| Emulsion A | 200 (100) | 200 (100) | 200 (100) | 200 (100) | 200 (100) | 200 (100) | 200(100) | 200 | 200 (100) | 200 (100) |
| Coloring pigment | 96 | 96 | 96 | 96 | 96 | 96 | 96 | 96 | 96 | 96 |
| Dispersant A | 2 | 2 | 2 | 2 | 2 | 2 | 2 | 2 | 2 | 2 |
| Dispersant B | 0.5 | 0.5 | 0.5 | 0.5 | 0.5 | 0.5 | 0.5 | 0.5 | 0.5 | 0.5 |
| Film forming assistant | 18 | 18 | 18 | 18 | 18 | 18 | 18 | 18 | 18 | 18 |
| Thickener | 3 | 3 | 3 | 3 | 3 | 3 | 3 | 3 | 3 | 3 |
| Defoaming agent | 3 | 3 | 3 | 3 | 3 | 3 | 3 | 3 | 3 | 3 |
| Anti-staining agent A | 50 (10) | — | — | — | — | — | — | — | — | — |
| Anti-staining agent B | — | 50 (10) | — | — | — | — | 30 (6) | — | — | — |

TABLE 1-continued

|  | Example 1-1 | Example 1-2 | Example 1-3 | Example 1-4 | Example 1-5 | Example 1-6 | Example 1-7 | Comparative Example 1-1 | Comparative Example 1-2 | Comparative Example 1-3 |
|---|---|---|---|---|---|---|---|---|---|---|
| Anti-staining agent C | — | — | 50 (10) | — | — | — | — | — | — | — |
| Anti-staining agent D | — | — | — | 50 (10) | — | — | — | — | — | — |
| Anti-staining agent E | — | — | — | — | 50 (10) | — | — | — | — | — |
| Anti-staining agent F | — | — | — | — | — | 50 (10) | — | — | — | — |
| Anti-staining agent G | — | — | — | — | — | — | 33 (4) | — | — | — |
| Anti-staining agent H | — | — | — | — | — | — | — | — | 50 (10) | — |
| Anti-staining agent I | — | — | — | — | — | — | — | — | — | 10 |
| Catalyst | — | — | — | — | — | — | — | — | — | 1 |

Numbers in the table are in parts by weight.
Numbers in the brackets are parts by weight of solid content.

<Test Method>

(1) Storage Stability

The coatings were produced and immediately viscosity was measured immediately. Then, each coating was packed in a container and the container was sealed, then stored in an atmosphere at 50° C. for 30 days, and viscosity was measured again.

The change in viscosity was examined by the following procedure. The evaluation criteria are as follows. Viscosity was measured using a Brookfield viscometer under standard conditions (temperature 23° C., relative humidity 50%).
o: The change in viscosity is less than 10%.
Δ: The change in viscosity is 10% to less than 50%.
x: The change in viscosity is 50% or more.

(2) Specular Gloss

A transparent glass plate of 150×120×3 mm was coated with the coating composition by a film applicator having a gap of 150 μm, and the glass plate was placed horizontally, then dried and cured for 48 hours under the standard conditions, and specular gloss was measured according to JIS K 5600-4-7. Measurement angle was 60°. High specular gloss is indicative of a preferable coating film excellent in gloss.

(3) Tack Free Time

A transparent glass plate of 150×120×3 mm was coated with the coating composition by a film applicator having a gap of 150 μm, and the glass plate was placed horizontally and dried under the standard conditions for a predetermined time. Then, siliceous sand was sprinkled on the surface of the coating film on the horizontally placed glass plate, and immediately thereafter, the glass plate was stood vertically to drop the siliceous sand by gravity-drop. The time having elapsed until the siliceous sand did not remain on the surface of the coating film was measured. This time is preferably shorter.

(4) Area of Dropped Water Current

An SK#1000 primer (epoxy resin-based primer, manufactured by SK KAKEN Co., Ltd.) was spray-coated to a dry thickness of 30 μm onto a 150×75×0.8 mm aluminum plate and dried for 8 hours under the standard conditions. Then, the coating composition was spray-coated to a dry thickness of 40 μm and cured for 7 days under the standard conditions to prepare a test specimen.

The test specimen obtained by the method described above was fixed at an angle of 60° to the horizontal plane, and a water current was continuously dropped onto a place on the test specimen apart by 30 mm of the upper end of the test specimen, to form a water film thereon, and the area of the water film thus formed was measured. The water current was dropped through a vinyl chloride tube (opening 3 mm) arranged upwards at a position apart by about 20 mm from the upper end of the test specimen. The flow rate was 140 ml/min. A greater area is indicative of a preferable coating film of high hydrophilicity.

(5) Pollution Resistance to Rain Streaking

A 300×150×3 mm aluminum plate was bent at an internal angle of 135° at a position of ⅓ from the upper end of the aluminum plate and used as a test base material. An SK#1000 primer was spray-coated to a dry thickness of 30 μm on the convex surface of this test base material and dried for 8 hours under the standard conditions. Then, the coating composition was spray-coated to a dry thickness of 40 μm thereon and dried and cured for 7 days under the standard conditions.

The test specimen obtained by the method described above, with the surface of its broader area being vertically, was arranged towards the south, in Ibaraki City in Osaka Prefecture, JP, and subjected to outdoor exposure for 3 months. The state of staining with rain streaking on the vertical surface was observed with the naked eye and evaluated in 5 ranks (superior: 5>4>3>2>1: inferior) depending on the degree of staining.

<Test Results>

The test results are shown in Table 2.

TABLE 2

|  | Example 1-1 | Example 1-2 | Example 1-3 | Example 1-4 | Example 1-5 | Example 1-6 | Example 1-7 | Comparative Example 1-1 | Comparative Example 1-2 | Comparative Example 1-3 |
|---|---|---|---|---|---|---|---|---|---|---|
| Storage stability | ○ | ○ | ○ | ○ | ○ | ○ | ○ | ○ | ○ | x |
| Specular gloss | 84 | 85 | 84 | 84 | 83 | 85 | 84 | 85 | 75 | 62 |
| Tack free time (hr) | 8 | 8 | 8 | 8 | 8 | 8 | 8 | 8 | 8 | 48 |
| Area of dropped water stream ($cm^2$) | 14 | 28 | 18 | 24 | 33 | 30 | 35 | 8 | 13 | 12 |
| Pollution resistance to rain streaking | 3 | 5 | 5 | 5 | 5 | 5 | 5 | 1 | 2 | 2 |

In Example 1-1 to Example 1-7, good results could be obtained in any tests. On the other hand, the coating in Comparative Example 1-1 wherein an anti-staining agent had not been added was excellent in coating stability but was significantly inferior in pollution resistance to rain streaking. The coating composition in Comparative Example 1-2 wherein general colloidal silica had been added was not satisfactory in respect of specular gloss and pollution resistance to rain streaking. The coating composition in Comparative Example 1-3 wherein a general organosilicate had been added was not satisfactory in respect of storage stability, specular gloss and pollution resistance to rain streaking.

Test Example 2

Natural Stone-Like Coating Material

<Production of the Coating Material>

According to the compositions shown in Table 3, the respective starting materials were mixed uniformly to produce each coating material in a usual manner. The compounding amounts in Table 3 are shown in parts by weight.

TABLE 3

|  | Example 2-1 | Example 2-2 | Example 2-3 | Example 2-4 | Example 2-5 | Example 2-6 | Example 2-7 | Comparative Example 2-1 | Comparative Example 2-2 | Comparative Example 2-3 |
|---|---|---|---|---|---|---|---|---|---|---|
| Emulsion B | 200 (100) | 200 (100) | 200 (100) | 200 (100) | 200 (100) | 200 (100) | 200 (100) | 200 (100) | 200 (100) | 200 (100) |
| Film forming assistant | 16 | 16 | 16 | 16 | 16 | 16 | 16 | 16 | 16 | 16 |
| Thickener | 5 | 5 | 5 | 5 | 5 | 5 | 5 | 5 | 5 | 5 |
| Defoaming agent | 3 | 3 | 3 | 3 | 3 | 3 | 3 | 3 | 3 | 3 |
| Anti-staining agent A | 50 (10) | — | — | — | — | — | — | — | — | — |
| Anti-staining agent B | — | 50 (10) | — | — | — | — | 30 (6) | — | — | — |
| Anti-staining agent C | — | — | 50 (10) | — | — | — | — | — | — | — |
| Anti-staining agent D | — | — | — | 50 (10) | — | — | — | — | — | — |
| Anti-staining agent E | — | — | — | — | 50 (10) | — | — | — | — | — |
| Anti-staining agent F | — | — | — | — | — | 50 (10) | — | — | — | — |
| Anti-staining agent G | — | — | — | — | — | — | 33 (4) | — | — | — |
| Anti-staining agent H | — | — | — | — | — | — | — | — | 50 (10) | — |
| Anti-staining agent I | — | — | — | — | — | — | — | — | — | 10 |
| Catalyst | — | — | — | — | — | — | — | — | — | 1 |
| Aggregate A | 520 | 520 | 520 | 520 | 520 | 520 | 520 | 520 | 520 | 520 |

Numbers in the table are in parts by weight.
Numbers in the brackets are parts by weight of solid content.

Test Method

(1) Storage Stability

The coating materials were produced and then viscosity was measured immediately. Then, each coating was packed in a container and the container was sealed, then stored in an atmosphere at 50° C. for 30 days, and viscosity was measured again. The change in viscosity was examined by the procedure described above. The evaluation criteria are as follows. Viscosity was measured using a Brookfield viscometer under standard conditions (temperature 23° C., relative humidity 50%).

○: The change in viscosity is less than 10%.
Δ: The change in viscosity is 10% to less than 50%.
x: The change in viscosity is 50% or more.

(2) Area of Dropped Water Current

An SK#1000 primer (epoxy resin-based primer, manufactured by SK KAKEN Co., Ltd.) was spray-coated to a dry thickness of 30 μm onto a 150×75×0.8 mm aluminum plate and dried for 8 hours under the standard conditions. Then, each coating material was spray-coated to a dry thickness of 1 mm and cured for 7 days under the standard conditions to prepare a test specimen.

The test specimen obtained by the method described above was fixed at an angle of 60° to the horizontal plane, and a water current was continuously dropped onto a place on the test specimen apart by 30 mm of the upper end of the test specimen, to form a water film thereon, and the area of the water film thus formed was measured. The water current was dropped through a vinyl chloride tube (opening 3 mm) arranged upwards at a position apart by about 20 mm from the upper end of the test specimen. The flow rate was 140 ml/min.

(3) Anti-Staining Properties

A 300×150×3 mm aluminum plate was bent at an internal angle of 135° at a position of ⅓ from the upper end of the aluminum plate and used as a test base material. An SK#1000 primer was spray-coated to a dry thickness of 30 μm on the convex surface of this test base material and dried for 8 hours under the standard conditions. Then, the coating composition was spray-coated to a dry thickness of 1 mm thereon and dried and cured for 7 days under the standard conditions.

The test specimen obtained by the method described above, with the surface of its broader area being vertically, was arranged towards the south, in Ibaraki City in Osaka Prefecture, JP, and subjected to outdoor exposure for 3 months. The state of contamination on the vertical surface was observed with the naked eye and evaluated in 5 ranks (superior: 5>4>3>2>1: inferior) depending on the degree of staining.

Test Results

The test results are shown in Table 4. In Example 2-1 to Example 2-7, good results could be obtained in any tests.

TABLE 4

|  | Example 2-1 | Example 2-2 | Example 2-3 | Example 2-4 | Example 2-5 | Example 2-6 | Example 2-7 | Comparative Example 2-1 | Comparative Example 2-2 | Comparative Example 2-3 |
|---|---|---|---|---|---|---|---|---|---|---|
| Storage stability | ○ | ○ | ○ | ○ | ○ | ○ | ○ | ○ | ○ | x |
| Area of dropped water stream (cm$^2$) | 34 | 42 | 38 | 39 | 48 | 50 | 44 | 15 | 25 | 27 |
| Pollution resistance to rain streaking | 2 | 4 | 4 | 4 | 5 | 5 | 5 | 1 | 2 | 2 |

Test Example 3

Thick Finishing Coating Material

<Production of the Coating Material>

According to the compositions shown in Table 5, the respective starting materials were mixed uniformly to produce each coating material in a usual manner. The compounding amounts in Table 5 are shown in parts by weight.

TABLE 5

|  | Example 3-1 | Example 3-2 | Example 3-3 | Example 3-4 | Example 3-5 | Example 3-6 | Example 3-7 | Comparative Example 3-1 | Comparative Example 3-2 | Comparative Example 3-3 |
|---|---|---|---|---|---|---|---|---|---|---|
| Emulsion B | 200 (100) | 200 (100) | 200 (100) | 200 (100) | 200 (100) | 200 (100) | 200 (100) | 200 (100) | 200 (100) | 200 (100) |
| Coloring pigment | 40 | 40 | 40 | 40 | 40 | 40 | 40 | 40 | 40 | 40 |
| Extender pigment | 150 | 150 | 150 | 150 | 150 | 150 | 150 | 150 | 150 | 150 |
| Aggregate B | 280 | 280 | 280 | 280 | 280 | 280 | 280 | 280 | 280 | 280 |
| Film forming assistant | 18 | 18 | 18 | 18 | 18 | 18 | 18 | 18 | 18 | 18 |
| Thickener | 8 | 8 | 8 | 8 | 8 | 8 | 8 | 8 | 8 | 8 |
| Defoaming agent | 4 | 4 | 4 | 4 | 4 | 4 | 4 | 4 | 4 | 4 |
| Anti-staining agent A | 50 (10) | — | — | — | — | — | — | — | — | — |

TABLE 5-continued

|  | Example 3-1 | Example 3-2 | Example 3-3 | Example 3-4 | Example 3-5 | Example 3-6 | Example 3-7 | Comparative Example 3-1 | Comparative Example 3-2 | Comparative Example 3-3 |
|---|---|---|---|---|---|---|---|---|---|---|
| Anti-staining agent B | — | 50 (10) | — | — | — | — | 30 (6) | — | — | — |
| Anti-staining agent C | — | — | 50 (10) | — | — | — | — | — | — | — |
| Anti-staining agent D | — | — | — | 50 (10) | — | — | — | — | — | — |
| Anti-staining agent E | — | — | — | — | 50 (10) | — | — | — | — | — |
| Anti-staining agent F | — | — | — | — | — | 50 (10) | — | — | — | — |
| Anti-staining agent G | — | — | — | — | — | — | 33 (4) | — | — | — |
| Anti-staining agent H | — | — | — | — | — | — | — | — | 50 (10) | — |
| Anti-staining agent I | — | — | — | — | — | — | — | — | — | 10 |
| Catalyst | — | — | — | — | — | — | — | — | — | 1 |

Numbers in the table are in parts by weight.
Numbers in the brackets are parts by weight of solid content.

<Test Method>

(1) Storage Stability

The coating materials were produced and viscosity was measured immediately. Then, each coating was packed in a container and the container was sealed, then stored in an atmosphere at 50° C. for 30 days, and viscosity was measured again.

The change in viscosity was examined by the procedure described above. The evaluation criteria are as follows. Viscosity was measured using a Brookfield viscometer under standard conditions (temperature 23° C., relative humidity 50%).

o: The change in viscosity is less than 10%.
Δ: The change in viscosity is 10% to less than 50%.
x: The change in viscosity is 50% or more.

(2) Area of Dropped Water Current

An SK#1000 primer (epoxy resin-based primer, manufactured by SK KAKEN Co., Ltd.) was spray-coated to a dry thickness of 30 μm onto a 150×75×0.8 mm aluminum plate and dried for 8 hours under the standard conditions. Then, each coating material was spray-coated to a dry thickness of 1 mm and cured for 7 days under the standard conditions to prepare a test specimen.

The test specimen obtained by the method described above was fixed at an angle of 60° to the horizontal plane, and a water current was continuously dropped onto a place on the test specimen apart by 30 mm of the upper end of the test specimen, to form a water film thereon, and the area of the water film thus formed was measured. The water current was dropped through a vinyl chloride tube (opening 3 mm) arranged upwards at a position apart by about 20 mm from the upper end of the test specimen. The flow rate was 140 ml/min.

(3) Anti-Staining Properties

A 300×150×3 mm aluminum plate was bent at an internal angle of 135° at a position of ⅓ from the upper end of the aluminum plate and used as a test base material. An SK#1000 primer was spray-coated to a dry thickness of 30 μm on the convex surface of this test base material and dried for 8 hours under the standard conditions. Then, each coating material was spray-coated to a dry thickness of 1 mm thereon and dried and cured for 7 days under the standard conditions.

The test specimen obtained by the method described above, with the surface of its broader area being vertically, was arranged towards the south, in Ibaraki City in Osaka Prefecture, JP, and subjected to outdoor exposure for 3 months. The state of contamination on the vertical surface was observed with the naked eye and evaluated in 5 ranks (superior: 5>4>3>2>1: inferior) depending on the degree of staining.

<Test Results>

The test results are shown in Table 6. In Example 3-1 to Example 3-7, good results could be obtained in any tests.

TABLE 6

|  | Example 3-1 | Example 3-2 | Example 3-2 | Example 3-4 | Example 3-5 | Example 3-6 | Example 3-7 | Comparative Example 3-1 | Comparative Example 3-2 | Comparative Example 3-3 |
|---|---|---|---|---|---|---|---|---|---|---|
| Storage stability | o | o | o | o | o | o | o | o | o | x |
| Area of dropped water stream (cm²) | 30 | 41 | 37 | 39 | 46 | 51 | 43 | 14 | 23 | 22 |
| Pollution resistance to rain streaking | 3 | 4 | 4 | 4 | 5 | 5 | 5 | 1 | 2 | 2 |

Test Example 4

Multicolor Design Coating

<Production of White Particle Dispersion Coating>

200 parts by weight of the emulsion C were charged into a container, and under stirring with an agitating blade at a rotation speed of 1800 rpm, 4 parts by weight of the water-soluble resin A, 12 parts by weight of a film forming assistant, 1 part by weight of a defoaming agent and 380 parts by weight of water were mixed uniformly therewith to produce an aqueous dispersing medium.

Then, 100 parts by weight of the emulsion C were charged into another container, and under stirring with an agitating blade at a rotation speed of 1800 rpm, 200 parts by weight of the water-soluble resin B, 100 parts by weight of a white pigment dispersion (60 wt % dispersion of titanium oxide), 5 parts by weight of a film forming assistant, 5 parts by weight of a defoaming agent, and 70 parts by weight of water were mixed uniformly therewith to produce a white coating.

8 parts by weight of 5 wt % aqueous ammonium borate was added as a dispersion stabilizer to 597 parts by weight of the aqueous dispersing medium described above, and uniformly mixed by an agitating blade at rotation speed of 900 rpm, and while the mixture was stirred, 480 parts by weight of the white coating described above was gradually added thereto and dispersed to give a coating having 0.8 to 1.2 mm white particles dispersed therein.

<Production of Gray Particle Dispersion Coating>

200 parts by weight of the emulsion C were charged into a container, and under stirring with an agitating blade at rotation speed of 1800 rpm, 4 parts by weight of the water-soluble resin A, 12 parts by weight of a film forming assistant, 1 part by weight of a defoaming agent and 380 parts by weight of water were mixed uniformly therewith to produce an aqueous dispersing medium.

Then, 85 parts by weight of the emulsion C were charged into another container, and under stirring with an agitating blade at a rotation speed of 1800 rpm, 250 parts by weight of the water-soluble resin B, 80 parts by weight of a white pigment dispersion (60 wt % dispersion of titanium oxide), 20 parts by weight of a black pigment dispersion (15 wt % dispersion of black iron oxide), 5 parts by weight of a film forming assistant, 5 parts by weight of a defoaming agent, and 50 parts by weight of water were mixed uniformly therewith to produce a gray coating.

8 parts by weight of 5 wt % aqueous ammonium borate was added as a dispersion stabilizer to 597 parts by weight of the aqueous dispersing medium described above, and uniformly mixed by an agitating blade at rotation speed of 900 rpm, and while the mixture was stirred, 495 parts by weight of the gray coating described above was gradually added thereto and dispersed to give a coating having 0.8 to 1.2 mm gray particles dispersed therein.

<Production of Multicolor Design Coating>

The gray particle dispersion coating and the black [sic] particle dispersion coating obtained by the methods described above, and an anti-staining agent, were mixed uniformly in the compounding ratio shown in Table 7.

TABLE 7

|  | Example 4-1 | Example 4-2 | Example 4-3 | Example 4-4 | Example 4-5 | Example 4-6 | Example 4-7 | Comparative Example 4-1 | Comparative Example 4-2 | Comparative Example 4-3 |
|---|---|---|---|---|---|---|---|---|---|---|
| White particle dispersion coating | 700 | 700 | 700 | 700 | 700 | 700 | 700 | 700 | 700 | 700 |
| Gray particle dispersion coating | 300 | 300 | 300 | 300 | 300 | 300 | 300 | 300 | 300 | 300 |
| Anti-staining agent A | 50 (10) | — | — | — | — | — | — | — | — | — |
| Anti-staining agent B | — | 50 (10) | — | — | — | — | 30 (6) | — | — | — |
| Anti-staining agent C | — | — | 50 (10) | — | — | — | — | — | — | — |
| Anti-staining agent D | — | — | — | 50 (10) | — | — | — | — | — | — |
| Anti-staining agent E | — | — | — | — | 50 (10) | — | — | — | — | — |
| Anti-staining agent F | — | — | — | — | — | 50 (10) | — | — | — | — |
| Anti-staining agent G | — | — | — | — | — | — | 33 (4) | — | — | — |
| Anti-staining agent H | — | — | — | — | — | — | — | — | 50 (10) | — |
| Anti-staining agent I | — | — | — | — | — | — | — | — | — | 10 |
| Catalyst | — | — | — | — | — | — | — | — | — | 1 |

Numbers in the table are in parts by weight.
Numbers in the brackets are parts by weight of solid content.

<Test Method>

(1) Storage Stability

The coatings were produced and viscosity was measured immediately. Then, each coating was packed in a container and the container was sealed, then stored in an atmosphere at 50° C. for 30 days, and viscosity was measured again.

The change in viscosity was examined by the procedure described above. The evaluation criteria are as follows. Viscosity was measured using a Brookfield viscometer under standard conditions (temperature 23° C., relative humidity 50%).
O: The change in viscosity is less than 10%.
Δ: The change in viscosity is 10% to less than 50%.
x: The change in viscosity is 50% or more.

(2) Area of Dropped Water Current

An SK#1000 primer (epoxy resin-based primer, manufactured by SK KAKEN Co., Ltd.) was spray-coated to a dry thickness of 30 μm onto a 150×75×0.8 mm aluminum plate and dried for 8 hours under the standard conditions. Then, each coating was spray-coated to a dry thickness of about 0.2 mm and dried and cured for 7 days under the standard conditions to prepare a test specimen.

The test specimen obtained by the method described above was fixed at an angle of 60° to the horizontal plane, and a water current was continuously dropped onto a place on the test specimen apart by 30 mm of the upper end of the test specimen, to form a water film thereon, and the area of the water film thus formed was measured. The water current was dropped through a vinyl chloride tube (opening 3 mm) arranged upwards at a position apart by about 20 mm from the upper end of the test specimen. The flow rate was 140 ml/min.

(3) Anti-Staining Properties

A 300×150×3 mm aluminum plate was bent at an internal angle of 135° at a position of ⅓ from the upper end of the aluminum plate and used as a test base material. An SK#1000 primer was spray-coated to a dry thickness of 30 μm on the convex surface of this test base material and dried for 8 hours under the standard conditions. Then, each coating was spray-coated to a dry thickness of about 0.2 mm thereon and dried and cured for 7 days under the standard conditions.

The test specimen obtained by the method described above, with the surface of its broader area being vertically, was arranged towards the south, in Ibaraki City in Osaka Prefecture, JP, and subjected to outdoor exposure for 3 months. The state of contamination on the vertical surface was observed with the naked eye and evaluated in 5 ranks (superior: 5>4>3>2>1: inferior) depending on the degree of staining.

<Test Results>

The test results are shown in Table 8. In Example 4-1 to Example 4-7, good results could be obtained in any tests.

INDUSTRIAL APPLICABILITY

The composition of the present invention can be used in surface finishing of various materials such as metal, glass, porcelain tile, concrete, siding board, extrusion-molded plate, plastic etc., and used mainly in protection of bodies such as buildings, civil engineering structures, etc.

We claim:

1. An aqueous coating composition comprising, as essential components, a synthetic resin emulsion (A) having a pH value of 4.0 to 10.0 and a neutral silica sol (B) having a particle diameter of 1 to 200 nm and a pH value of 5.0 to 7.8, wherein the neutral silica sol (B) component is contained in an amount of 0.1 to 50 parts by weight in terms of solid content relative to 100 parts by weight of the solid content of the synthetic resin emulsion (A), and the electrical conductivity of the neutral silica sol (B) is 1 mS/cm or less wherein the neutral silica sol (B) includes particles made of a compound which is formed by hydrolysis condensation of silicate, is rigid, and has silanol groups (Si-OH) on the surfaces of the particles and the neutral silica sol has been subjected to hydrophobation treatment.

2. The aqueous coating composition according to claim 1, which further comprises aggregate (B) having a particle diameter of 0.05 to 5 mm in an amount of 100 to 4000 parts by weight relative to 100 parts by weight of the solid content of the synthetic resin emulsion (A).

3. The aqueous coating composition according to claim 1, which further comprises a coloring pigment (C), an extender pigment (D), and aggregate (E) having a particle diameter of 0.05 to 5 mm such that 1 to 300 parts by weight of the coloring pigment (C), 10 to 1000 parts by weight of the extender pigment (D) and 10 to 2000 parts by weight of the aggregate (E) are contained per 100 parts by weight of the solid content of the synthetic resin emulsion (A).

4. The aqueous coating composition according to claim 1, which further comprises at least one kind of colored coating (F) dispersed in a granular state.

5. The aqueous coating composition according to claim 1, wherein the neutral silica sol (B) contains two or more kinds of neutral silica sol (B) different in average primary particle diameter.

TABLE 8

|  | Example 4-1 | Example 4-2 | Example 4-3 | Example 4-4 | Example 4-5 | Example 4-6 | Example 4-7 | Comparative Example 4-1 | Comparative Example 4-2 | Comparative Example 4-3 |
|---|---|---|---|---|---|---|---|---|---|---|
| Storage stability | ○ | ○ | ○ | ○ | ○ | ○ | ○ | ○ | ○ | x |
| Area of dropped water stream (cm²) | 18 | 30 | 23 | 28 | 35 | 36 | 32 | 12 | 15 | 17 |
| Pollution resistance to rain streaking | 3 | 4 | 4 | 4 | 5 | 5 | 5 | 1 | 2 | 2 |

6. The aqueous coating composition according to claim 1, wherein the neutral silica sol (B) has a particle diameter of 10 to 50 nm.

7. The aqueous coating composition according to claim 1, wherein the hydrophobation treatment is carried out by complexing a compound having at least one functional group selected from the group consisting of Alkoxysilane compound, Alcohols, Glycols, Glycol ethers, and Fluorine alcohols with the neutral silica sol (B).

8. The aqueous coating composition according to claim 1, wherein the neutral silica sol (B) is complexed with a polyoxyalkylene group-containing compound.

9. The aqueous coating composition according to claim 1, wherein the silicate from which the neutral silica sol (B) component is produced is selected from the group consisting of tetramethoxy silane, tetraethoxy silane, tetra-n-propoxy silane, tetraisopropoxy silane, tetra-n-butoxy silane, tetraisobutoxy silane, tetra-sec-butoxy silane, tetra-t-butoxy silane, tetraphenoxy silane or condensates thereof.

10. The aqueous coating composition according to claim 9 wherein the silicate from which the neutral silica sol (B) component is produced further comprises an alkoxy silane compounds dimethoxydiethoxy silane, methyltrimethoxy silane, methyltriethoxy silane, ethyltrimethoxy silane, ethyltriethoxy silane, dimethyldimethoxy silane, and diethyldimethoxy silane.

* * * * *

UNITED STATES PATENT AND TRADEMARK OFFICE
CERTIFICATE OF CORRECTION

PATENT NO. : 7,683,123 B2  Page 1 of 1
APPLICATION NO. : 10/596590
DATED : March 23, 2010
INVENTOR(S) : Sei-ichi Onoue and Shigeto Kamimura It is certified that error appears in the above-identified patent and that said Letters Patent is hereby corrected as shown below:

Column 4/line 47; After "methacryl") insert --.--.

Column 4/line 57; Change "chloprene" to --chloroprene--.

Column 5/line 36; Change "trifluroethyl(meth)acrylate," to --trifluoroethyl(meth)acrylate,--.

Column 7/line 15; Change "thereof" to --thereof.--.

Column 15-16/line 6; Change "200" to --200(100)--.

Column 23-24/line 3-4; Change "Example 3-2" to --Example 3-3--.

Column 28/line 26; In Claim 2, Change "(B)" to --(E)--.

Signed and Sealed this

Thirty-first Day of August, 2010

David J. Kappos
*Director of the United States Patent and Trademark Office*

UNITED STATES PATENT AND TRADEMARK OFFICE
CERTIFICATE OF CORRECTION

PATENT NO. : 7,683,123 B2 Page 1 of 1
APPLICATION NO. : 10/596590
DATED : March 23, 2010
INVENTOR(S) : Sei-ichi Onoue and Shigeto Kamimura It is certified that error appears in the above-identified patent and that said Letters Patent is hereby corrected as shown below:

Column 30/line 9, In Claim 10, change "compounds" to --compound selected from the group consisting of--.

Signed and Sealed this

Fifth Day of October, 2010

David J. Kappos
*Director of the United States Patent and Trademark Office*